(12) United States Patent
Huang

(10) Patent No.: US 6,785,580 B2
(45) Date of Patent: Aug. 31, 2004

(54) CONTROL APPARATUS FOR PORTABLE COMPUTER

(75) Inventor: Robert Huang, Taipei (TW)

(73) Assignee: First International Computer Inc., Taipei (TW)

( * ) Notice: Subject to any disclaimer, the term of this patent is extended or adjusted under 35 U.S.C. 154(b) by 7 days.

(21) Appl. No.: 10/212,269

(22) Filed: Aug. 6, 2002

(65) Prior Publication Data

US 2004/0030412 A1 Feb. 12, 2004

(51) Int. Cl.$^7$ .............................. G09G 5/08; G06F 13/10
(52) U.S. Cl. ........................... 700/83; 700/65; 345/158; 710/73
(58) Field of Search ................................ 345/158, 169, 345/163, 168, 180; 700/65, 83; 710/73, 36

(56) References Cited

U.S. PATENT DOCUMENTS

| | | | | |
|---|---|---|---|---|
| 5,764,224 A | * | 6/1998 | Lilja et al. | 345/179 |
| 5,945,981 A | * | 8/1999 | Paull et al. | 345/180 |
| 6,035,350 A | * | 3/2000 | Swamy et al. | 710/73 |
| 6,163,326 A | * | 12/2000 | Klein et al. | 345/156 |
| 6,327,484 B1 | * | 12/2001 | Mathew | 455/575.7 |
| 6,424,335 B1 | * | 7/2002 | Kim et al. | 345/158 |
| 2001/0033267 A1 | * | 10/2001 | Kim et al. | 345/156 |

* cited by examiner

*Primary Examiner*—Anthony Knight
*Assistant Examiner*—Aaron Perez-Daple
(74) *Attorney, Agent, or Firm*—Browdy and Neimark, P.L.L.C.

(57) ABSTRACT

A control apparatus comprises a control unit, a portable computer, a receiving module and a controller. The control unit includes a connector, a laser-pointer transmission circuit, a control circuit, a transmission module and a chargeable battery. A power switch button and a set of operating buttons are provided on the control unit and respectively connect the control circuit. In the portable computer, a connection socket is internally mounted to engage with the connector of the control unit when the control unit is inserted in the portable computer. The connection socket is connected to a circuit control unit of the portable computer that controls the execution of a user's command. When the control unit is detached from the portable computer, the portable computer can be remotely controlled directly by means of the control unit.

6 Claims, 4 Drawing Sheets

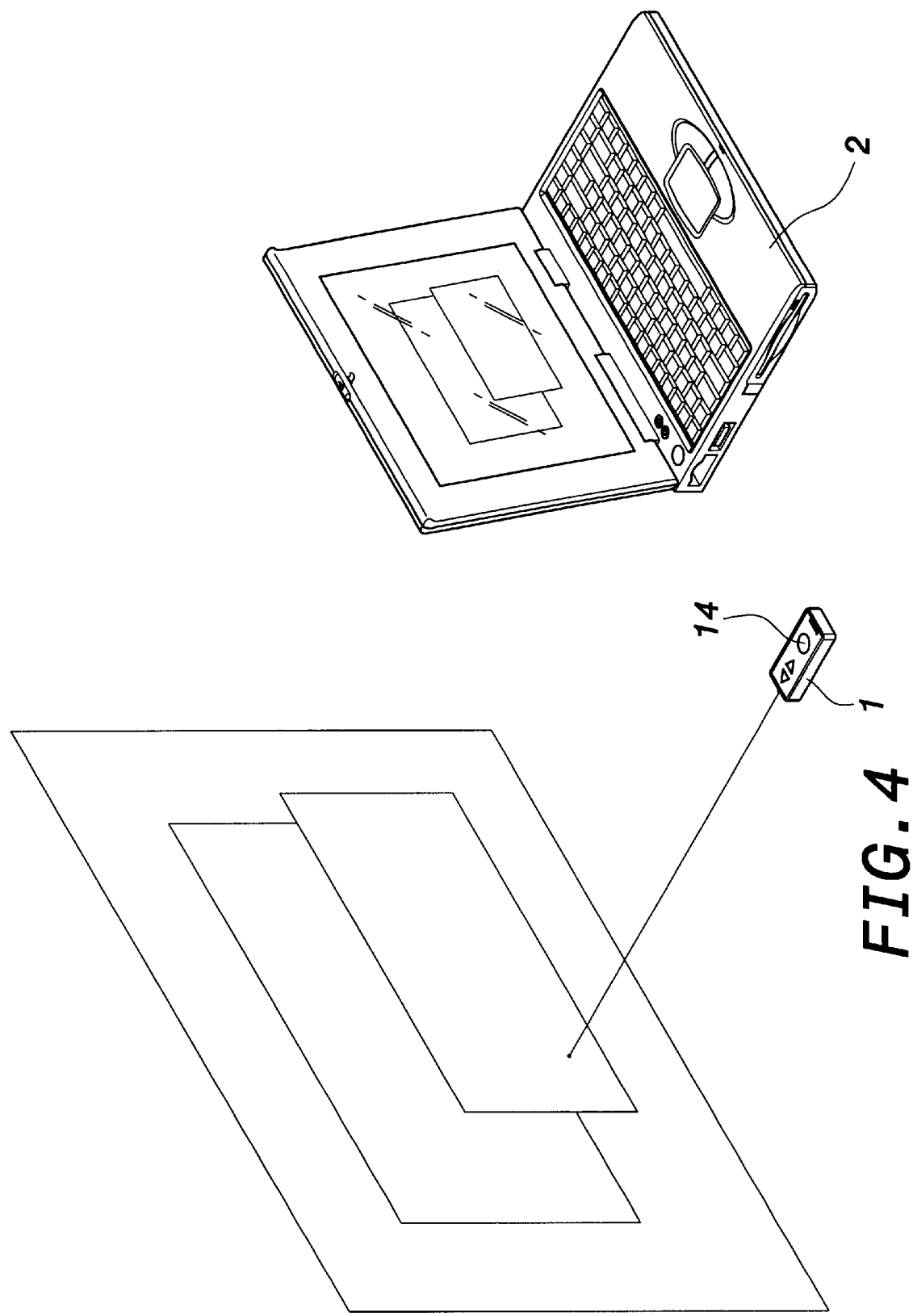

CONTROL APPARATUS FOR PORTABLE COMPUTER

BACKGROUND OF THE INVENTION

1. Field of the Invention

The invention relates to a control apparatus for a portable computer. More particularly, the invention relates to a control apparatus having a control unit that can be installed in the portable computer. A user can use the control unit to switch on/off the portable computer or remotely operate an up/down-paging or laser pointing.

2. Description of the Related Art

To effectively perform a conference or a briefing, a user usually needs a portable computer associated with a display apparatus such as a projector or a LCD. The portable computer is provided with a keyboard to allow the user to page up or page down the displayed frame.

In most situations, the computer connected to the display apparatus via cables is not in proximity of the user. Therefore, it is not convenient for the user to page up/down the displayed frame via the keyboard of the computer.

A wireless controller has been provided to remotely control the operation of the computer. However, it needs a high production cost and is not compatible with all types of portable computer. The control circuits in the wireless controller are traditionally designed in the type of USB. Therefore, only portable computers provided with USB receiving circuits are capable of receiving signals from the wireless controller. Further, the wireless controller is externally provided and can not be disposed within the portable computer.

Moreover, any person can usually switch on the portable computer, which does not allow a confidentiality of the data stored in the computer.

SUMMARY OF THE INVENTION

It is therefore one object of the invention to provide a control apparatus that can be used to switch on/off a portable computer, remotely control various operations of the computer such as up/down-paging, or used as a laser pointer.

It is another object of the invention to provide a control apparatus having a control unit that is detachably mounted to the portable computer. The control unit is used to achieve on/off-switches of the portable computer and further controls the power source of the portable computer. A non-authorized operator is therefore not able to use the computer.

To accomplish the above and other objectives, a control apparatus used to control a portable computer is provided. The control apparatus comprises a control unit having a connector and a laser-pointer transmission circuit. The portable computer has a main body and a display device. A receiving slot is arranged through a side of the main body of the portable computer. A connection socket is arranged in the receiving slot. A receiving module is connected inside the main body of the portable computer. One output terminal of the receiving module is connected to a controller. The controller is connected to a circuit control unit. The controller decodes a signal sent by the receiving module and outputs the decoded data to the circuit control unit to perform desired operations. A power key and two hot keys are provided on a top surface of the main body corresponding to the respective locations of a power switch button and operating buttons of the control unit inserted in the slot. A control circuit is placed in the control unit and respectively connects the connector, the power switch button, the operating buttons, the laser-pointer transmission circuit and a transmission module. According to the states of the power switch button and the operating buttons, the control circuit performs certain functions, and then the transmission module outputs a corresponding signal or drives the laser-pointer transmission circuit to emit a light beam.

To provide a further understanding of the invention, the following detailed description illustrates embodiments and examples of the invention, this detailed description being provided only for illustration of the invention.

BRIEF DESCRIPTION OF THE DRAWINGS

The drawings included herein provide a further understanding of the invention. A brief introduction of the drawings is as follows:

FIG. 4 is a schematic view showing a control apparatus used to project a laser pointer according to an embodiment of the invention.

DETAILED DESCRIPTION OF THE EMBODIMENTS

Figure 1:
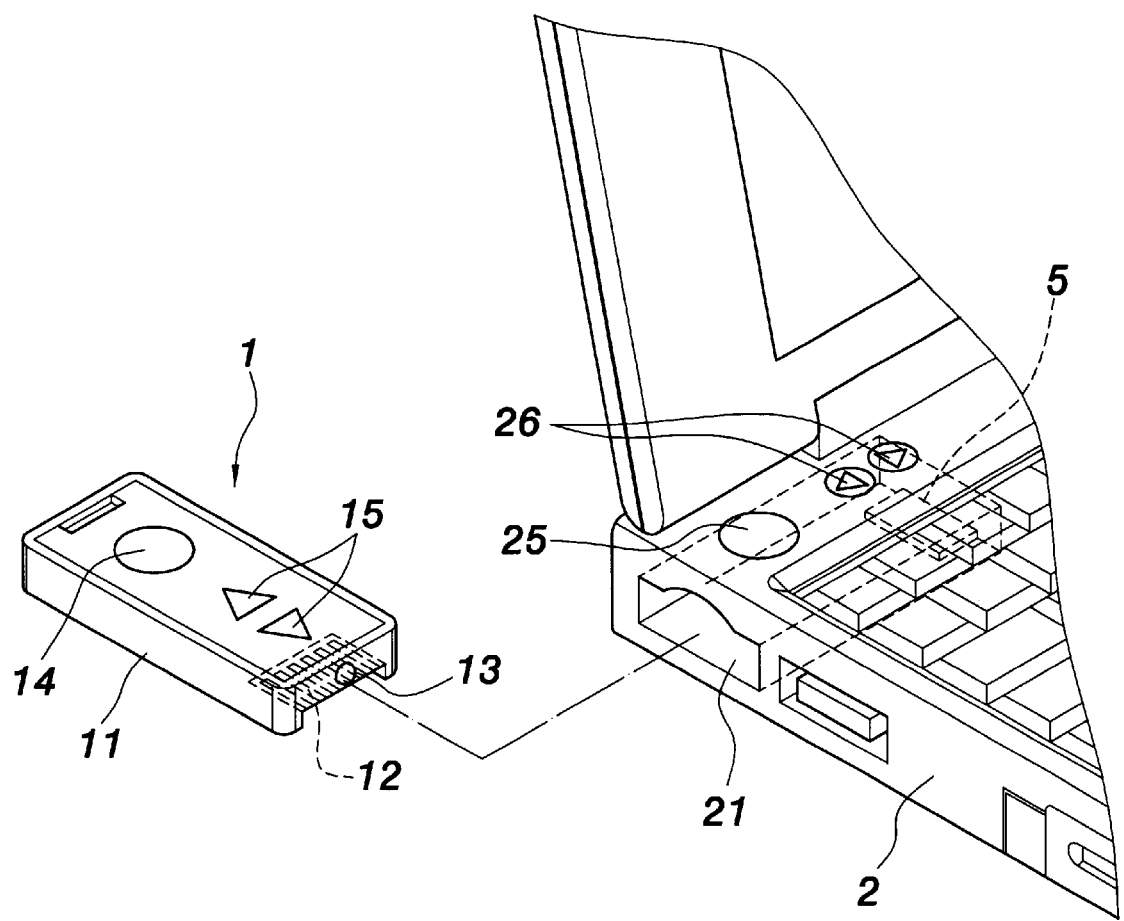
FIG. 1 is an exploded view of a control apparatus according to an embodiment of the invention.

Wherever possible in the following description, like reference numerals will refer to like elements and parts unless otherwise illustrated.

Figure 2:
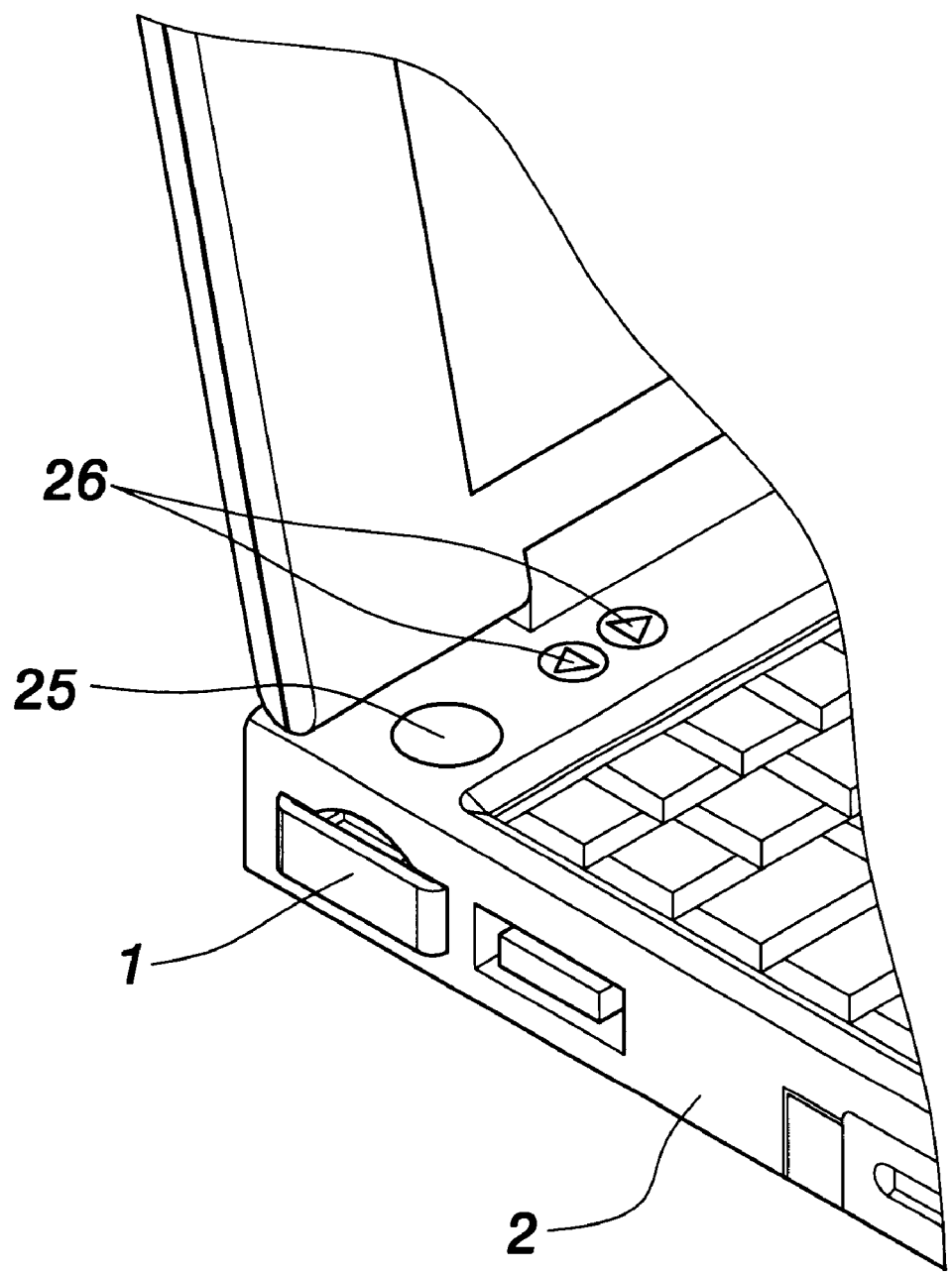
FIG. 2 is a perspective view of showing the assembly of a control apparatus according to an embodiment of the invention.
Figure 3:
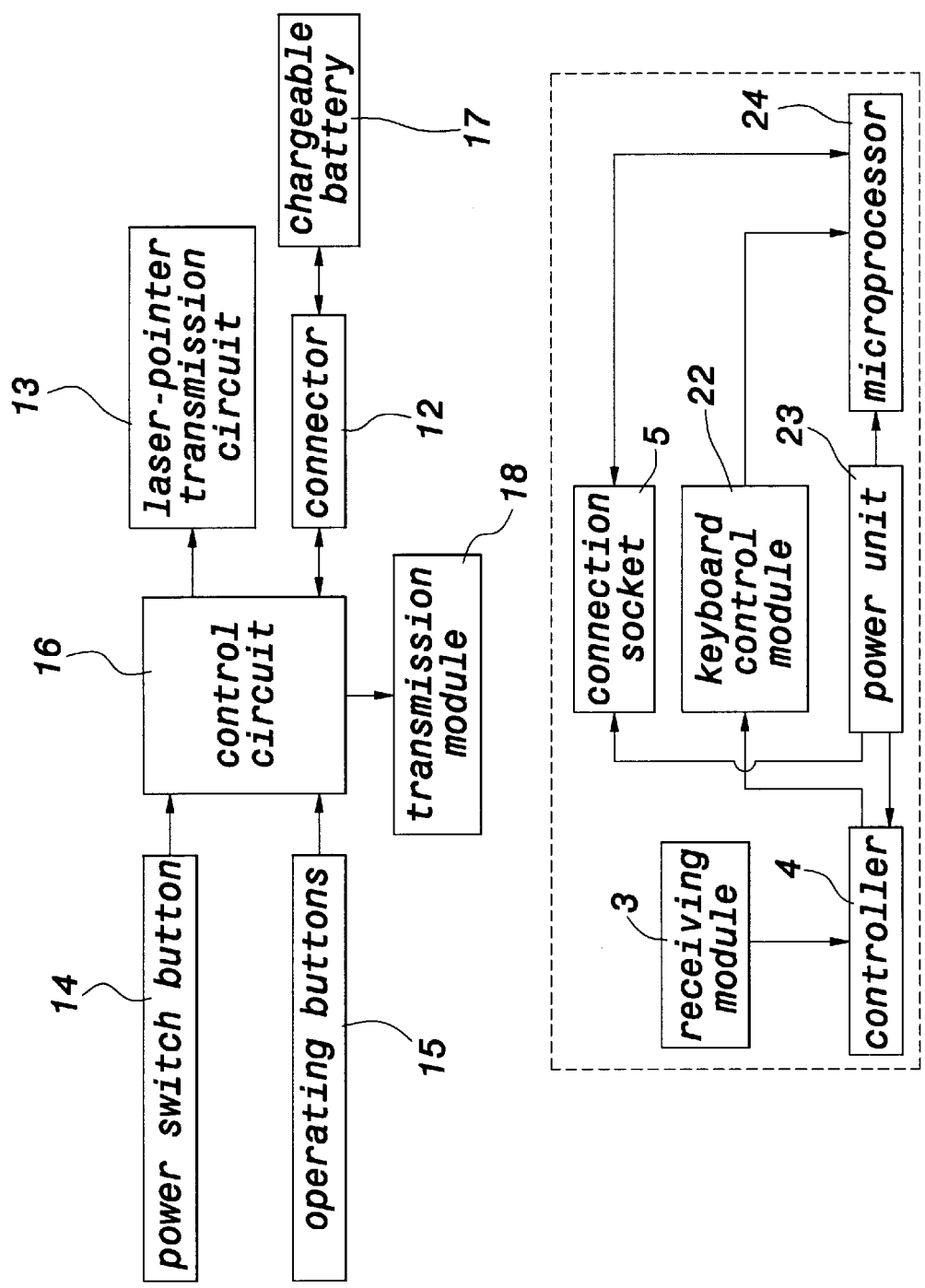
FIG. 3 is a block diagram of a control apparatus according to an embodiment of the invention.

With reference to FIG. 1 to FIG. 3, a control apparatus of the invention includes a control unit 1, a portable computer 2, a receiving module 3, a controller 4 and a connection socket 5. The control unit 1 is detachably mounted to the portable computer 2.

The control unit 1 includes a case 11, a connector 12, a laser-pointer transmission circuit 13, a power switch button 14, a set of operating button 15, a control circuit 16, a chargeable battery 17, and a transmission module 18.

The case 11 has a generally rectangular shape. The connector 12 is located inside the case 11 near one side edge of the case 11. The laser-pointer transmission circuit 13 is capable of emitting a light beam under the drive of the control circuit 16.

The power switch button 14 is provided on the case 11 to selectively switch on/off the portable computer 2 or achieve laser pointing.

The operating buttons 15 are provided on the case 11. The operating buttons 15 are preferably two up/down-paging buttons.

The control circuit 16 is mounted in the case 11 and respectively connects the connector 12, the power switch button 14 and the operating buttons 15. Output terminals of the control circuit 16 respectively connect the laser-pointer transmission circuit 13 and the transmission module 18. According to the states of the power switch button 14 and the operating buttons 15, the control circuit 16 performs certain functions such as coding, and then the transmission module 18 outputs a corresponding signal or drives the laser-pointer transmission circuit 13 to emit a pointing light beam. The transmission module 18 can be a radio frequency (RF) or infrared (IR) transmission module.

The chargeable battery 17 connects the connector 12 to supply power to the control circuit 16.

The portable computer 2 has a monitor and a main body. A receiving slot 21 is arranged through a side of the main body of the portable computer 2. A connection socket 5 is arranged in the receiving slot 21 in such a manner that when the connector 12 of the control unit 1 is inserted, the connection socket 5 engages with the connector 12. A circuit control unit for controlling the execution of the user's commands is provided in the main body of the portable computer 2. The circuit control unit includes a keyboard control module 22, a power unit 23 and a microprocessor 24. The microprocessor 24 respectively connects the keyboard control module 22, the power unit 23 and the connection socket 5. A power key 25 and two hot keys 26 are located on a top surface of the main body of the portable computer 2 corresponding to the respective locations of the power switch button 14 and the operating buttons 15 of the control unit 1 when this latter is inserted in the slot 21. Thereby, a user can operate the portable computer 2 by means of either the power key 25 or the hot keys 26.

The receiving module 3 is mounted in the portable computer 2 and receives the signal emitted from the transmission module 18 of the control unit 1.

The controller 4 is mounted in the portable computer 2 and respectively connects the receiving module 3 and the circuit control unit. The controller 4 decodes the signal received by the receiving module 3 and delivers an output to the circuit control unit after decoding. Thereby, desired operations such as on/off-switch of the portable computer 2, or up/down-paging are performed.

When the control unit 1 is inserted into the receiving slot 21 of the portable computer 2, the connector 12 engages with the connection socket 5. A user then can go on line, receive/send e-mails or switch on/off the computer directly through the power key 25 or the hot keys 26.

When the control unit 1 is detached from the computer 2, the user can remotely control the operation of the portable computer 2 by means of the control unit 1.

With reference to FIG. 4, the laser-pointer transmission circuit 13 emits a light beam when the power switch button 14 of the control unit 1 is pressed down. Therefore, the control unit 1 can be used as a laser pointer during an oral presentation.

The operating buttons 15 can be attributed with various functions for multi-medium or browser.

In view of the foregoing, the invention therefore includes at least the following advantages:

1. The control unit can be detachably mounted to the portable computer.
2. The user can switch on/off the computer or remotely control the computer directly by means of the control unit.
3. The control unit further controls the power source of the portable computer. Therefore, the operation of the computer by a non-authorized user is prevented.
4. The control unit can be used as a laser indicator.

It should be apparent to those skilled in the art that the above description is only illustrative of specific embodiments and examples of the invention. The invention should therefore cover various modifications and variations made to the herein-described structure and operations of the invention, provided they fall within the scope of the invention as defined in the following appended claims.

What is claimed is:

1. A control apparatus for remote controlling a portable computer having a main body, the control apparatus comprising:

a control unit, having a connector and a laser-pointer transmission circuit, wherein the connector electrically connects a chargeable battery;

a power switch button, provided on the control unit for switching on/off the portable computer;

a plurality of operating buttons, provided on the control unit and attributed with specific functions;

a control circuit, mounted in the control unit and respectively connecting the connector, the power switch button and the operating buttons, wherein a plurality of output terminals of the control circuit are respectively connected to the laser-pointer transmission circuit and a transmission module, and according to states of the power switch button and the operating buttons, the control circuit performs at least a specific function, and then the transmission module outputs a corresponding signal or drives the laser-pointer transmission circuit to emit a light beam;

a receiving module, mounted in the portable computer for receiving a signal emitted from the transmission module of the control unit; and a controller, mounted inside the portable computer and respectively connecting the receiving module and a circuit control unit, the controller decoding the signal received by the receiving module and sending an output to the circuit control unit after decoding;

wherein a side of the main body is provided with a receiving slot and a connection socket in the receiving slot so that the connection socket is able to engage with the connector after the control unit is inserted in the receiving slot, the connection socket further connects with the circuit control unit, which controls an operation of the portable computer, the main body has a power key and hot keys, the power key and hot keys are capable of being controlled by a user only when the control unit is engaged with the portable computer via the connector and the connection socket.

2. The control apparatus of claim 1, wherein the operating buttons are attributed with various functions for multi-media or browser.

3. The control apparatus of claim 1, wherein the hot keys are attributed with the functions of going on line or receiving/sending e-mail.

4. The control apparatus of claim 1, wherein the transmission module is a radio frequency (RF) or infrared (IR) transmission module.

5. The control apparatus of claim 1, wherein when the control unit is detached from the main body, depression of the power switch button causes the laser-pointer transmission module to emit a light beam.

6. The control apparatus of claim 1, wherein locations of the power key and hot keys on the main body corresponds to locations of the power switch button and the operating buttons, respectively, on the control unit inserted in the recieving slot such that depression of the power key and hot keys causes operation of the control circuit via the power switch button and the operating buttons, respectively.

* * * * *